UNITED STATES PATENT OFFICE.

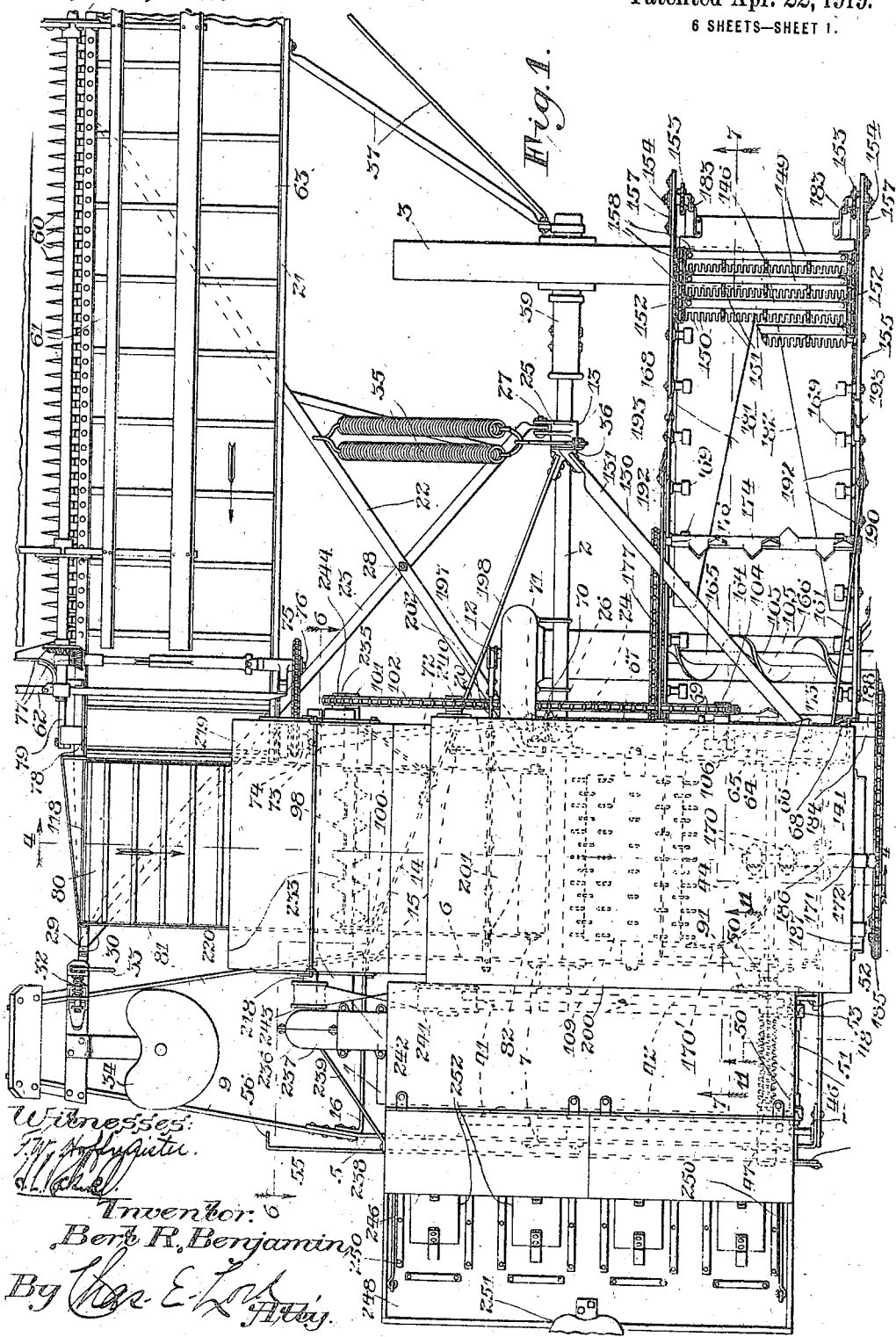

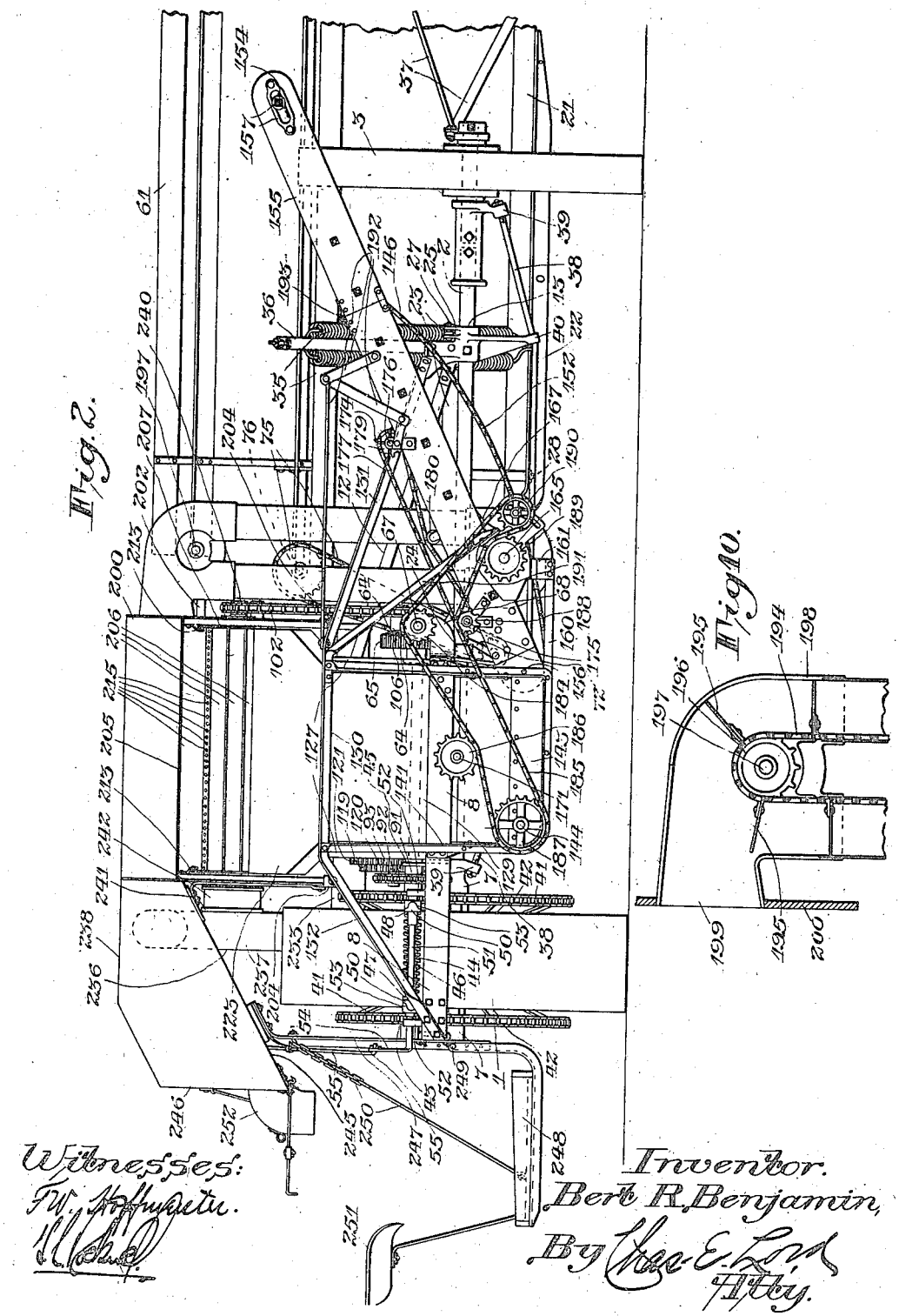

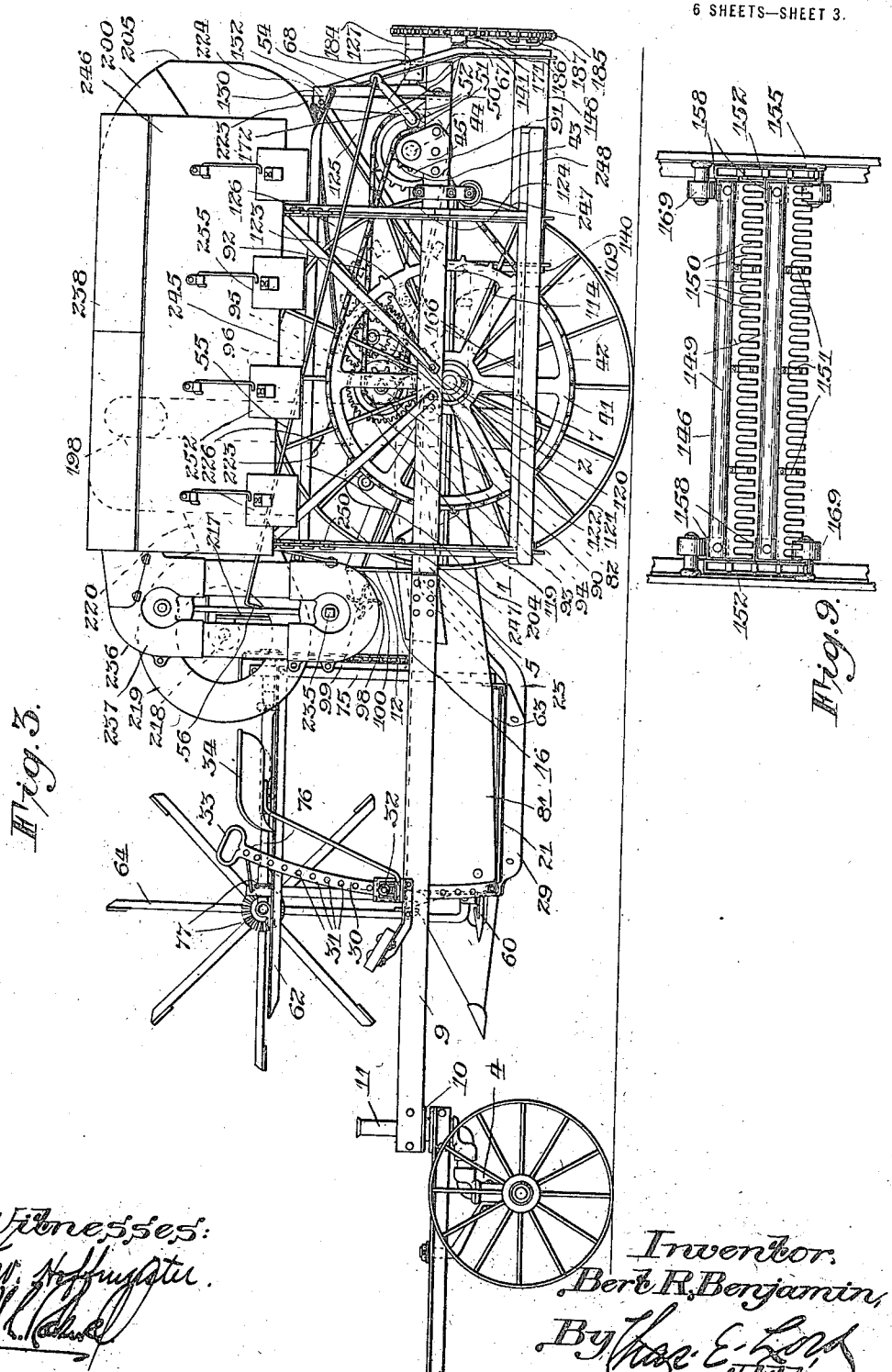

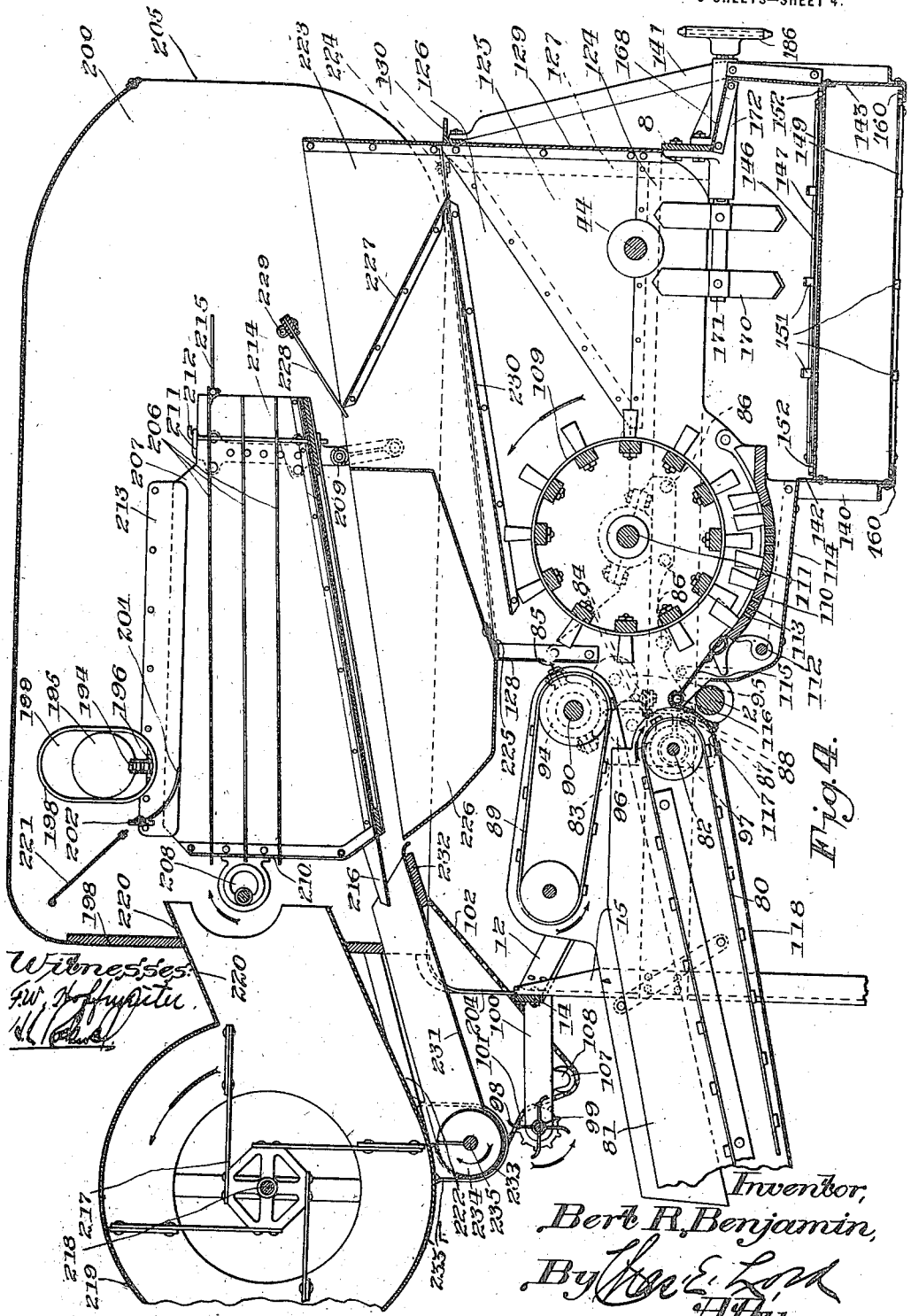

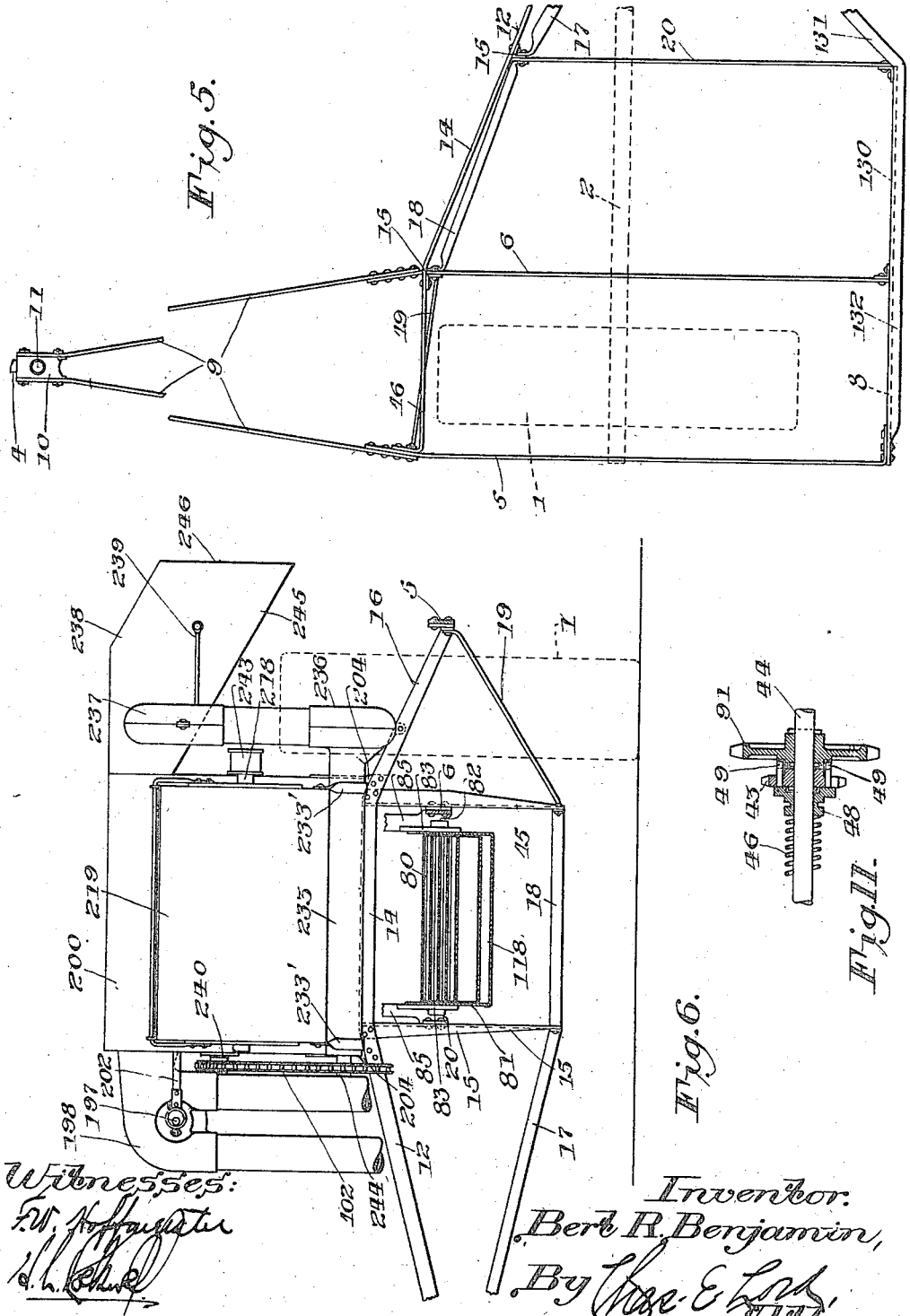

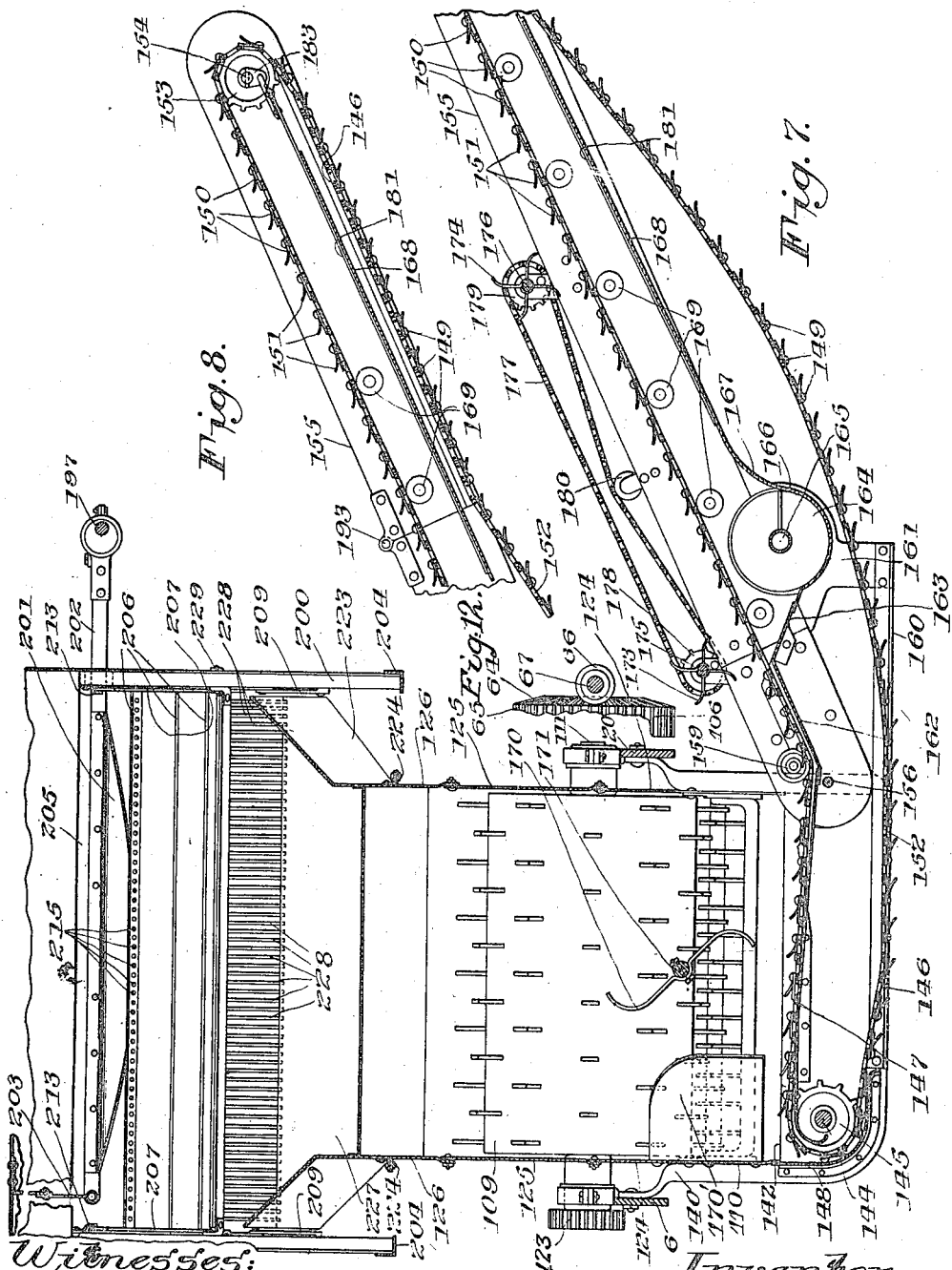

BERT R. BENJAMIN, OF OAK PARK, ILLINOIS, ASSIGNOR, BY MESNE ASSIGNMENTS, TO INTERNATIONAL HARVESTER COMPANY, A CORPORATION OF NEW JERSEY.

HARVESTER-THRESHER.

1,301,361.        Specification of Letters Patent.     Patented Apr. 22, 1919.

Application filed November 19, 1914. Serial No. 872,924.

*To all whom it may concern:*

Be it known that I, BERT R. BENJAMIN, a citizen of the United States, residing at Oak Park, in the county of Cook and State of Illinois, have invented certain new and useful Improvements in Harvester-Threshers, of which the following is a full, clear, and exact specification.

My invention relates to harvester threshers.

It has among its objects to increase the capacity and efficiency of a machine of this character in such a manner that the same is made adapted to operate satisfactorily even under the most diverse conditions found in service. A further object of my invention is to produce an improved light, compact machine having improved traction and adapted to be drawn by a small number of horses and readily housed and shipped. A still further object of my invention is to provide improved means for conveying, threshing and separating the grain, together with improved means for delivering the threshed straw and collecting the grain and weed seed, and improved means for bagging the separated grain. These and other objects of my invention will more fully hereinafter appear.

I attain these objects by means of an improved construction of machine including improved delivering, threshing, separating and grain and straw handling mechanism arranged in an improved frame and coöperating in an improved manner, all as hereinafter more clearly and fully set forth.

In order that my invention may be fully disclosed, I have illustrated in the accompanying drawings one embodiment which the same may assume in practice, it being understood that this embodiment is used as illustrative of the invention and that the invention itself is not limited to the precise construction shown but may be modified.

Figure 1 is a plan view of this embodiment of my invention.

Fig. 2 is a rear elevation of the construction shown in Fig. 1.

Fig. 3 is a side elevation of the same showing the stubbleward side of the construction shown in Fig. 1.

Fig. 4 is a longitudinal sectional view taken on line 4—4 of Fig. 1 showing the feeding, threshing and separating mechanism in section.

Fig. 5 is a plan view of a portion of the machine frame.

Fig. 6 is a partial transverse sectional view taken on line 6—6 of Fig. 1.

Fig. 7 is a transverse sectional view taken on line 7—7 of Fig. 1 showing a rear view of certain of the threshing and separating mechanism and a partial sectional view of the transversely disposed straw carrier and feeding mechanism, certain of the driving connections being omitted to facilitate illustration.

Fig. 8 is a detail sectional side elevation of the outer end of the straw carrier shown in Fig. 7.

Fig. 9 is a detail plan view of a portion of the carrier.

Fig. 10 is a detail sectional view showing one of the grain delivering conveyers.

Fig. 11 is a detail sectional view of the main clutch mechanism taken on line 11—11 of Fig. 1, and Fig. 12 is an enlarged detail view partly broken away, showing a portion of the gearing between the main power shaft and the power transmitting shaft.

In order to facilitate consideration of the construction shown in these drawings, I will first describe in a general way the course of the grain through the machine. As the latter moves down the field, the standing grain is cut by the cutter mechanism, which is disposed on the grainward side of the device, and delivered stubbleward by a suitable conveyer. It is then delivered rearwardly by a conveyer mechanism between the main and grain wheels to mechanism which threshes it. By this latter mechanism both the threshed grain and the straw are delivered rearwardly onto a transversely moving straw carrier carried at the back of the machine. This carrier separates the grain from the straw, ejecting the straw grainwardly and delivering the grain to further longitudinally disposed conveying mechanism which conveys the same toward the front of the machine, where it is elevated to a rearwardly blowing separator carried above and in front of the threshing mechanism. This separator then acts upon the grain, cleaning the same, the tailings being again delivered therefrom direct to the thresher, while the clean grain is conveyed stubbleward and then upward and rearward to a longitudinally disposed grain box carried above the main wheel so that an operator on a platform beside the box and outside the main wheel may bag the grain.

With this general understanding of the course of the grain through the machine, I will now proceed to describe specifically the structure shown, describing first the main thresher truck so that the relation of the parts may be more clearly understood.

The thresher truck.

As shown, this truck includes a main wheel 1 carried on the stubbleward end of a transversely disposed axle 2 having a grain wheel 3 at its grainward end, the two wheels coöperating with a frame supported on the axle and a front wheel truck 4 to form a support for the several mechanisms of the machine.

The frame mentioned includes longitudinally disposed, parallel, horizontal frame members 5 and 6 supported on the axle 2 by suitable brackets 7. These frame members are connected at their rear ends by a horizontally extending sill member 8, the end of which protrudes grainwardly beyond the rear end of the member 6, as shown in Fig. 5, while at their front ends the members 5 and 6 are connected to forwardly extending converging frame members 9 disposed in the same plane, which are in turn connected by a block 10 acting as a journal for the upstanding shank 11 of the tongue truck 4. Coöperating with the frame thus formed is a supplemental front frame member 12 fixed to a bracket 13 carried on the axle 2 at a point adjacent the grain wheel 3. This frame member is disposed above the frame member 6, as shown in Fig. 6, and is provided with a horizontally disposed portion 14 supported by vertical upright or frame members 15 spaced apart from each other, the stubbleward end of the member 12 being bent downward, as shown at 16, and attached to the outer frame member 5. Coöperating with the horizontal portion 14 of the member 12 and with the uprights 15 in forming a substantially rectangular frame, is a lower frame member 17 likewise fixed to the bracket 13 and disposed stubblewardly and downwardly beneath the member 12. This member 17 is connected to a horizontal member 18 corresponding to the portion 14 of the member 12 above described, the member 18 being attached to the uprights 15 at the lower ends of the same, and the stubbleward upright 15 being braced on the frame member 5 by an upwardly and stubblewardly extending brace 19. It is further to be noted that the rear sill member 8, which protrudes grainwardly beyond the rear end of the main frame member 6, is connected at its grainward end with a third longitudinally extending frame member 20 parallel to the members 5 and 6 in the same plane therewith, which is connected to the grainward upright 15 at a point between its ends, as shown in Figs. 4 and 6.

Coöperating with the frame thus formed is the usual grain platform 21. This platform is disposed transversely to the line of draft in front of the grain wheel 3 and is operatively connected to the axle 2 through diagonally disposed crossing braces 22 and 23 pivoted to the brackets 24 and 25, carried by the axle, at points 26 and 27 in alinement with each other and in front and above the axle, the bracket 25 perferably being in the form of an extension on the bracket 13, as shown in Fig. 1. As also shown in that figure, these braces 22 and 23 are connected together at a point intermediate their ends by a vertically extending bolt 28, and the front ends of the same protrude forward to such an extent that they underlie the grain platform 21, the front end of the brace 22 extending diagonally and grainwardly beneath the platform, while the front end of the brace 23 extends diagonally and stubblewardly beneath the platform, the latter being attached at its outer end to a parallel frame member 29 forming a part of the platform frame. It is thus seen that the platform is pivotally connected to the axle 2 so that it may be adjusted vertically with respect to the ground to accommodate it to varying lengths of grain.

In order to provide for such a vertical adjustment of the platform, an upstanding adjusting member 30 of arcuate shape (Figs. 1 and 3) is pivotally attached to the platform at a point adjacent the front and stubbleward end of the member 29 of the platform, and this member 30 is provided with a plurality of openings 31 along its length adapted to receive a spring-pressed foot-controlled detent 32 and be raised and lowered by a handle 33 in such a manner that an operator seated in a seat 34, carried on the front frame members 9, may adjust the height of the platform as desired. In order to assist in this operation of adjusting the platform 21, the latter is also provided with suitable balancing springs 35 connected at one of their ends to a part of the platform frame; as, for instance, the member 22, and at their opposite ends to an upright or standard 36 carried on the bracket 13. Further, in order to give the desired rigidity to the parts in the different positions of adjustment of the platform 21, the latter is operatively connected to the outer end of the axle 2 by suitable braces 37 and the main frame is braced by a supplemental brace 38 rigidly connected beneath the axle 2 between the main wheel 1 and grain wheel 3, this brace being connected at its ends to suitable brackets 39 carried on the axle and extending through suitable brackets 40 disposed between its ends, the last mentioned brackets preferably being in the form of arms integral with the brackets 13 and 24.

Having now described the construction of the main frame and that of the grain platform, I will describe the power connections so that it may be understood how the various mechanisms carried thereon are driven.

Power connections.

As is usual in machines of this type, the power for the same is derived from the main wheel 1, although it is to be understood that if desired the power may be developed from any other suitable source.

As illustrated in Figs. 1 and 3, the main wheel is provided with a plurality of large sprocket wheels 41, rigidly attached thereto on opposite sides of the same, which are connected through rearwardly extending parallel chains 42 to smaller sprocket wheels 43 loosely mounted and spaced apart on a shaft 44, which is in turn journaled in suitable brackets 45 carried on the rear ends of the longitudinal frame members 5 and 6 and in rear of the main wheel. On this shaft 44 a transversely disposed coiled spring 46 is carried, one end of which normally acts to press a ratchet clutch member 47, splined to the shaft, into engagement with a corresponding ratchet face formed on the left-hand sprocket 43 and thereby hold the parts in gear, while the other end of the spring normally presses in an opposite direction a sliding clutch member 48 loosely mounted on the shaft and having clutch fingers 49 thereon which move transversely through the right-hand sprocket 43, as shown in Fig. 11 for a purpose hereinafter described. These clutch members 47 and 48 are controlled by longitudinally extending, spaced, clutch shipping members 50 slidably mounted on a second transverse shaft 51 journaled in rear of the shaft 44 in suitable brackets 52, and are provided with cam portions 53 coöperating with corresponding portions fixed to the shaft, so that when the latter is rotated a reciprocating movement is given the clutch shipping members to connect or disconnect the clutches as desired. To give the necessary rotation to the shaft a crank 54 is provided on the stubbleward end of the same, and this crank is connected with a longitudinally extending link 55 having a handle 56 at its front end accessible from the seat 34 so that the operator may throw the various mechanisms in or out of gear as desired by a simple reciprocation of the link 55. (See Figs. 2 and 3.)

From this main power shaft 44 all the power for the rest of the mechanism is derived. With this understanding of the main power connections I will, therefore, proceed to describe these separate mechanisms, in each case so far as possible considering these mechanisms in the order in which they act upon the grain and tracing their power connections from this shaft. I will accordingly first consider the mechanism which acts upon the standing grain and delivers it to the theshing mechanism; namely, the grain cutting and conveying mechanism.

The grain cutting and conveying mechanism.

As in the usual construction, the portion of this mechanism which acts upon the standing grain comprises cutting mechanism 60 disposed along the front of the grain platform 21, a reel 61 carried upon frame members 62 positioned above the platform 21 (only one of which is shown), and a conveyer 63 for feeding the grain in a stubbleward direction as it falls upon the platform.

This mechanism is driven, as indicated above, from the power shaft 44, being driven through a bevel face 64 on a combined gear 65 carried on the grainward end of the shaft 44, this bevel face meshing with a coöperating bevel gear 66 fixed to a longitudinally extending shaft 67 journaled at its rear end in an upward extension 68 on the grainward end of the rear sill member 8 and intermediate its ends in a bracket 69 carried on the longitudinally extending frame member 20. The front end of this shaft 67 is journaled in an extension 70 on the bracket 24 and is preferably connected to a point adjacent that bracket through a universal joint connection 71 with an extensible tumbler shaft 72 protruded forward and downward toward the stubbleward end of the grain platform 21, where the front end of this shaft is connected through another universal connection 73 with a short shaft 74 journaled on the platform 21. This shaft 74 is connected through a suitable chain sprocket connection 75 to a shaft 76 journaled on the reel frame 62, this shaft 76 preferably being made extensible and flexible as in the case of the preceding shaft 72 and being connected at its front end through bevel gearing 77 with the shaft of reel 61. As in the usual construction, this shaft 74 also serves to provide the power for rotating the roller 78 for the conveyer 63 and operating the pitman connection 79 for the cutting mechanism 60.

Obviously, as the grain is cut by the cutting mechanism 60 it will be laid upon the conveyer 63 by the reel 61 with its heads to the rear and be fed by that conveyer stubbleward in the direction of the arrow shown in Fig. 1 toward the stubbleward end of the platform 21. It is there delivered upon a rearwardly moving conveyer 80 carried in a suitable conveyer box 81 (Fig. 4). This conveyer is supported at its front end on the platform 21 and extends rearwardly through the rectangular opening formed by the front frame members 14, 15 and 18 (Fig. 6) to a point adjacent the axle 2, where it is pivoted on a shaft 82 to suitable spaced brackets 83 projecting forward of the axle in such a manner that the pivots of the conveyer are in alinement with the pivots 26 and 27 of the grain platform and no derangement of the parts may result when that platform is adjusted (Fig. 4).

Here also it is to be noted that the brackets 83 are rigidly connected through bolt and lug connections 84 with the front ends of larger spaced brackets 85 attached at 86 to the longitudinal frame members 6 and 20 (Fig. 4), and that these brackets 83 are provided with lugs 87 on their lower ends receivable in hooks 88 on the lower front ends of the brackets 85, the construction being such that while the brackets 83 are normally rigidly connected to the brackets 85 and form a rigid support for the swinging conveyer 80, both the brackets 83 and the conveyer 80 may be readily detached from the brackets 85 by detaching the bolt connection 84 and lifting the lugs 87 out of the hooks 88. It is, of course, obvious that when the conveyer 80 is moved with the grain platform 21 by manipulation of the adjusting member 30, the conveyer box 81 will have ample room for its movement about the pivot of the latter in the rectangular opening formed by the frame members 14, 15 and 18.

This conveyer 80 coöperates with an overhanging conveyer 89, the rear end of which is disposed slightly beyond the rear end of the conveyer 80 and carried on a shaft 90 journaled on the upper end of the bracket 85. As shown, the front end of this conveyer is mounted in an upwardly extending portion of the conveyer casing 81 and the conveyer itself is disposed at an angle with respect to the conveyer 80, the two conveyers converging toward the rear in such a manner as to enable them to exert a compressing action upon the grain at the same time that they feed it rearward, the fixed relation between the pivots of the two conveyers tending to maintain the latter in the desired relation in any position of adjustment of the grain platform so that the grain is always fed directly rearward between the same to threshing mechanism hereinafter to be described and shown in Fig. 4.

The power for driving these conveyers is, as indicated, derived from the main power shaft 44. As shown, a sprocket wheel 91 is carried on the shaft 44 on the grainward side of the grainward sprocket 43, which sprocket 91 is connected to the sprocket 43 mentioned through the clutch fingers 49 of the clutch member 48, as shown in Fig. 13, when the clutch operating link 55 is operated. This sprocket 91, as shown in Fig. 3, is provided with a longitudinally disposed chain 92 coöperating with a sprocket 93 on the upper conveyer shaft 90 in such a manner as to impart rotation to that shaft and thereby rotate a gear 94 carried on that shaft, which, through coöperating meshing gears 95 and 96, drives a gear 97 fixed to the shaft 82 of the conveyer 80. Obviously, through this construction the two conveyers will be driven in a direction to feed the grain rearwardly and may be thrown in or out of gear by a simple reciprocation of the link 55.

Under average conditions I find that the coöperating conveyers 80 and 89 are sufficient to handle a very heavy crop, delivering the grain heads rearward to the threshing mechanism in the desired manner, but as in certain harvester thresher districts the weeds are very heavy and difficulty is experienced in getting these heavy weeds between the conveyers mentioned, I provide supplemental means for handling such a weedy crop. These means, in their embodiment illustrated, comprise a beater 98 mounted upon a beater shaft 99 journaled on forwardly protruding horizontal extensions 100 attached to the horizontal portion 14 of the frame member 12. This beater extends transversely across and over the conveyer 80 at a point in front of the supplemental conveyer 89 and may assume various forms. In the construction illustrated, however, it assumes the form of radially arranged, curved, triangular sections (Figs. 1 and 4), as I find that this construction is admirably suited to the feeding of weedy material without tangling, serving to prevent the bulk of the material from coming into contact with the frame and to compress the same into a charge of a proper size to be handled by the coöperating conveyers 80 and 89.

The power for this supplemental beater 98 is, as in all preceding cases, derived from the power shaft 44. As shown, a sprocket 101 is provided on the end of the beater shaft and driven through a longitudinally extending chain 102 connected at its rear end to a sprocket 103. This sprocket 103 is in turn fixed to a transverse shaft 104 journaled in the bracket 69 and driven through a gear 105 on the opposite end of the shaft 104 by the peripheral teeth 106 on the combined gear 65 carried on the grainward end of the shaft 44 and referred to above. As shown, this chain 102 also acts as a power mechanism for other mechanism hereinafter to be described, and as it is of considerable length, an idler sprocket 107 is provided therefor on a suitable bracket 108 formed on one of the extensions 100 which act as the supports for the beater 98. (See Figs. 1 and 4.)

Operating upon the grain which is delivered with its heads to the rear by the conveying mechanism 80, 89 just described is the threshing mechanism.

*The threshing mechanism.*

This mechanism comprises a cylinder 109 and coöperating concave 110 which act upon the grain to thresh the same as it is delivered by the coöperating conveyers 80 and 89.

As shown in Fig. 4, the cylinder 109 is of standard construction, and is mounted on a shaft 111 journaled on the frame at a point above and in rear of the axle 2 in the brackets 85, the horizontal axis of the cylinder being disposed substantially opposite the interval between the conveyers 80 and 89. The concave 110 is carried beneath the cylinder in the usual manner and may also be of any standard construction, preferably being of the sectional type shown, adjustable by means of the usual concave adjusting cam 112 and having slots 113 therein through which some of the threshed grain falls onto an inclined chute or deflector 114, which chute 114 in turn diverts the grain to straw carrier mechanism, which latter carries it grainward during the first stages of its movement toward the separator, and is hereinafter to be described, also, in order to assist in handling the grain and delivering to the chute 114 any grain which may be threshed out by the conveyers before it is delivered to the cylinder 109, is a supplemental chute 115 provided on a transverse shaft 116 supported in the frame above the axle 2, which supplemental chute 115 extends over the front end of the concave and serves to bridge the interval between the same and the front end of the conveyer 80. Attention is here also directed to a downwardly and forwardly curved lip or chute 117 which is likewise carried on the shaft 116 and acts to prevent the loss of any grain carried around by the slats of the conveyer 80, this chute overlapping the bottom 118 carried by the conveyer box 81 in any position to which the latter may be adjusted.

The power connections for the cylinder are driven from the main shaft 44 through the chain 92 and the shaft 90 of the upper or supplemental conveyer 89, a gear 119 being carried on that shaft and meshing with a smaller gear 120 carried on a stub shaft 121 fixed to the stubbleward bracket 85. This shaft 121 in turn carries a larger gear 122 which meshes with a small gear 123 on the end of the cylinder shaft, thereby imparting rotation to the cylinder through the same mechanism which operates the conveyers so that both the cylinder and the conveyers may be thrown into and out of operation by manipulation of the clutch mechanism controlled by the clutch controlling link 55 operable from the operator's seat 34.

As shown in Figs. 2 and 4, the threshing mechanism is carried in a suitable housing or box having longitudinally extending side members, each formed of three sections 124, 125 and 126. Of these sections, the sections 124 are preferably of substantially rectangular shape and rigidly attached to the frame members 6 and 20, extending downward therefrom, the grainward one having a cut-away portion in rear of the cylinder (see Figs. 4 and 7) for a purpose hereinafter described. The sections 125, on the other hand, are of substantially triangular shape and disposed above the rear end of the sections 124, as shown, having their rear ends attached to upstanding uprights or straps 127 fixed to the rear ends of the sections 124, the sections 125 having suitable overlapping lower edges engaging the upper edges of the rear ends of the sections 124. The sections 126 also rest upon the sections 124 but at the front ends of the same, each having a rear inclined overlapping edge resting upon and removably attached to the corresponding inclined edge of the sections 125 and having its front end removably attached to the brackets 85. It is thus seen that the upper sections 126 may be detached from the sections 124 and 125 in such a manner that they may be removed and thereby enable access to be had to the cylinder for the removal of the same or any necessary repairs. It is here also to be noted that the front end of the casing thus formed is closed by an end wall 128 fixed to the bracket 85 extending part way down between the end of the conveyer 89 and the teeth of the cylinder to prevent clogging and perform another function hereinafter described, and that the rear end of the casing is closed by a rear end wall 129 connected to the straps or uprights 127. Attention here is also directed to the fact that the rear wall is rigidly attached to and braced on the main frame by a horizontal portion 130 of a supplemental angle brace member having one downwardly and grainwardly extending end 131 rigidly attached to the bracket 13 and its other downwardly and stubblewardly extending end 132 rigidly attached to the rear sill 8.

As indicated, after the grain has been threshed by the threshing mechanism described, it is delivered rearward, the cylinder rotating in the direction of the arrow and ejecting the same upward and rearward, as shown, the wall 129 serving to prevent any of the straw from passing out of the casing and insuring the delivery of the same to the mechanism which carries it away from the cylinder and at the same time carries away the grain which has fallen down over the chute 114.

*Straw carrier mechanism.*

This mechanism includes a flexible endless conveyer disposed transversely with respect to the line of draft, receiving both the straw and grain from the cylinder 109 and chute 114, respectively, and ejecting the straw grainwardly at a point adjacent the grain wheel 3, while the grain is delivered to a longitudinally disposed grain conveyer or auger disposed between the runs or reaches of the conveyer, which grain conveyer delivers the grain to coöperating conveying mechanism for conveying the same to the separator.

As shown, this mechanism is disposed beneath and in rear of the grain chute 114 and is carried on a suitable frame comprising transversely disposed, substantially U-shaped members 140 and 141. Of these members the member 140 is disposed substantially beneath the cylinder 109 and has its upper ends rigidly attached to the frame members 6 and 20, while the member 141 is disposed in rear of the end wall 129 of the thresher casing and has its upper ends rigidly attached to the horizontal portion of the frame member 130, its arms being bent forward intermediate their ends, as shown in Fig. 4, to accommodate the width of the straw carrier, hereinafter described. Attached to these U-shaped members 140 and 141 are also transversely disposed parallel side plates 142 and 143, in which is journaled a longitudinally disposed shaft 144 carrying on its opposite ends a plurality of sprockets 145, of which only one is shown (see Fig. 7).

Over these sprockets extends my improved flexible straw carrier 146, the same as it travels grainward, moving over a floor 147 carried by the side members 142, 143, and between the sprockets 145 and a shield 148 as it moves up into a position beneath the straw delivered by the cylinder, the bottom of the frame being open to permit the slack portion of the conveyer to drop, as shown in Fig. 7. This conveyer 146 in my improved construction is in the form of a plurality of slats 149, each having a series of elongated parallel, stubblewardly extending fingers 150 projecting from one side of the same and coöperating with a plurality of spaced supplemental fingers 151 slightly inclined with respect to the same. As shown in Figs. 7 and 9, each of these slats is operatively connected at its opposite ends by transversely extending chains 152 passing over the sprockets 145 and coöperating sprockets 153 carried on adjustable shafts 154 in the grainward end of a conveyer casing 155 pivoted to the grainward arms of the members 140 and 141 at 156, the length of the conveyer being adjustable by adjusting the shafts 154 longitudinally of the casing 155 by suitable adjusting mechanism 157. Further, each of the slats 149 is preferably seated in a block 158 carried by the chain, these blocks having a function hereinafter to be described.

As shown in Fig. 7, this improved endless conveyer 146 moves directly horizontally beneath the charge delivered by the cylinder 109 and the chute 114, and acts to carry both the grain and straw grainward, the carrier, at a point adjacent the grainward side of the thresher casing, by means of rollers 159, being deflected upward in the conveyer casing 155. It is further to be noted that extensions or supports 160 protrude grainwardly from the bottom of the U members 140 and 141, and that the supports 160 carry brackets 161 acting as supports for the conveyer casing 155. Attention is here also directed to the fact that the upper floor 147 of the horizontal portion of the casing is also provided with an extension 162 underlying the grainward end of the same and protruding at an angle therefrom, which extension is fixed to the casing 155 and protrudes part way up the conveyer, itself being provided with a downwardly inclined extension 163 leading to a longitudinally disposed screw conveyer or auger 164 for the grain mounted on a shaft 165 extending between the upper and lower reaches or runs of the conveyer. This screw conveyer 164 is in turn carried in a cylindrical casing 166 supported by the bracket 161, and this casing 166 is also provided, at a point beneath the conveyer 146, with an inclined portion 167 forming an extension of a floor 168 in the bottom of the transverse conveyer casing 155.

As the straw is carried out from the thresher casing by my improved conveyer 146, it is desirable that the same be agitated in such a manner as to separate effectually the threshed straw and the grain so that all the grain will be delivered to the grain conveyer 164 and none will be discharged with the straw. This I accomplish in the form of my invention shown herein by the provision of an improved construction comprising a series of rollers 169 carried on the opposite sides of the casing 155 beneath the chains 152, which rollers coöperate with the blocks 158 on the slats in imparting an undulating movement to the conveyer, which acts to swing the slats and cause their fingers 150 and 151 to agitate the straw. Obviously, through this mechanism, under ordinary conditions, any threshed grain still remaining in the straw will be shaken out of the same and dropped upon the floor 168 of the conveyer casing, by which it will be deflected to the curved floor 167 and to the grain conveyer or auger 164.

In order, however, to supplement the straw turning action and the straw agitating action of my improved conveyer under certain heavy grain conditions, I also provide supplemental means coöperating therewith and with the cylinder in the form of my invention shown herein. These means comprise a supplemental beater 170 mounted on a shaft 171, which is disposed longitudinally of the machine in rear of the cylinder.

This shaft 171 is journaled in a suitable bearing 172 disposed beneath the rear sill member 8 of the frame, and carries a plurality of spaced beater elements preferably so shaped and disposed as shown in Figs. 4 and 7, which, when the shaft is revolving in a counterclockwise direction, act to stir or agitate the straw in such a manner as to supplement the action of the cylinder, at the same time delivering the straw grainwardly out onto the conveyer 146 and preventing any clogging or packing of the straw against the rear wall 143 of the conveyer casing, a supplemental deflector 170' being provided if desired to guide to the beater 170 the straw delivered by the cylinder.

In order to further coöperate with the conveyer 146 under the conditions described, I preferably also provide one or more coöperating straw agitators which, if desired, may assume the form of beaters, two being shown at 173 and 174 journaled on shafts 175 and 176 spaced apart from each other and supported on suitable brackets carried on the upper edges of the conveyer casing 155. As shown, these beaters are preferably the same construction as the beater 98, as I find that this construction is well adapted to agitate the straw. They are also each preferably driven from the same power element, as, for instance, a chain 177 connected to sprockets 178 and 179, a suitable chain tension 180 being provided to coöperate therewith.

In order to further assist in the efficient action of the straw carrier, I may also provide improved means operatively connected to a moving part of the mechanism for expediting the delivery to the screw or grain conveyer of any grain which may fall through the upper end of the conveyer 146. This mechanism preferably includes a flat sliding plate 181 having a V-shaped opening 182 (Fig. 1) between its sides and slidable over the bottom 168 of the conveyer casing. This sliding plate is connected through a crank connection 183 with the grainward shafts 154 of the conveyer 146 in such a manner that it is given a sliding movement back and forth over the floor 168 and is thereby enabled to act as a forwarding agent for the grain, directing the same downward over the sloping floor to the screw conveyer 164.

The power for all of these various mechanisms is derived from the main power shaft 44, being taken directly from the rear end of the shaft 67 through a sprocket 184, a single chain 185 passing over that sprocket, under a sprocket 186 on the rear end of the beater shaft 171, around sprocket 187 on the rear end of the stubbleward conveyer shaft 144, over a sprocket 188 on the rear end of the supplemental beater shaft 175, over a sprocket 189 on the screw conveyer shaft 165, and around a supplemental idler sprocket 190, the entire mechanism thus being driven from the main power shaft and being controllable by the clutch mechanism operable by the clutch operating link 55. It is here also to be noted that, if desired, the beater shafts 175 and 176 of the supplemental beaters 173, 174 on the conveyer may be connected to the chain 185.

In this connection I may also state that, in order to insure the desired rigidity of the construction, I may brace the conveyer casing 155 on the thresher casing by means of suitable braces 191 and 192, and that to facilitate handling of the conveyer mechanism when shipping the machine, I may make that conveyer casing 154 of the folding type by providing a suitable hinge connection 193 at a point between its ends.

Coöperating with the screw conveyer 164 is the grain mechanism for elevating the grain and distributing the same to the separator.

*Grain elevating and separating mechanism.*

This mechanism is operatively connected to the shaft 165 of the grain auger 164 and receives the grain from the front end of that grain auger, elevating the same and distributing it over the surface of the separator screens hereinafter described, which are carried above and in front of the thresher cylinder.

It comprises a vertically moving conveyer including a chain 194 having paddles 195 thereon, which chain is operated by sprockets 196 carried on the front end of the shaft 165 (not shown) and an upper shaft 197 journaled in the conveyer casing 198. As shown, this conveyer casing is provided at its upper end with an enlarged mouth 199, and the gearing connections are such that when the shaft 165 is rotated a rapid movement is given to the conveyer chain 194, causing the paddles thereon to throw out the grain in a thin spray through the mouth 199 so that it will be well distributed over the screens on the separator mechanism, hereinafter to be described, and carried within the separator casing 200.

Coöperating with this elevating and spreading mechanism is supplemental grain spreading mechanism shown herein in the form of a reciprocating, transversely disposed distributer 201 carried on a pitman 202 resiliently supported at its stubbleward end by a support 203 and connected at its grainward end to an extension on the shaft 197 in such a manner that as the grain is distributed in a thin spray the member 201, by its reciprocating movement, acts to further agitate the same and spread it evenly over the top screen of the separator, distributing any piles which may accumulate on that screen due to the passage of the machine over uneven ground.

Receiving the grain from this grain elevating and distributing mechanism is the separator mechanism.

*Grain separator.*

This mechanism is carried in the longitudinally extending, substantially rectangular separator box or casing 200. This box is carried by rearwardly extending supports 204, connected at their front ends to the frame member 12 and at their rear ends to the member 130, the box 200 also being connected to the elevator casing 198 and a grain box hereinafter to be described. As shown, the entire separator box is carried in a position above the thresher casing and slightly in front of the same, and is provided with an open rear end 205 having a slightly downwardly curved top leading to the opening.

This separator box receives the grain through the wide mouth 199 of the elevator casing 198 and carries a plurality of superimposed screens 206 in a suitable frame 207 supported by and receiving a rocking motion from an eccentric connection 208 at the front end of the same and pivoted at its rear end to the separator frame through crank connections 209. As shown, the screens 206 are adjustably mounted in this frame in supports 210 and are superimposed one above the other, while the screen frame 207 is carried at its rear end on a bracket 211 and positioned with respect thereto by a pin 212, the bracket 211 preferably acting as a pivot for the crank connection 209. It is further to be noted that longitudinally extending flanges 213 are provided on the inner walls of the casing 198 which overlap the upper edges of the screen frame 207 and prevent the wedging of the same by dirt or the like. Attention here is also directed to the fact that the bottom of the frame 207 is made inclined and provided with a weed screen 214, as well as the fact that a series of longitudinally extending horizontally disposed fingers 215 are attached to the rear end of the upper screen 206, and a chute 216 is attached to the front end of the weed seed screen 214.

Coöperating with the separator screens just described is a fan 217 carried on a shaft 218 in a casing 219 disposed in front of the separator casing and above the beater 98, the draft from the fan being conveyed into the separator casing through a rearwardly extending draft chute 220 in such a manner as to distribute the draft rearwardly between the screens. Attention here is also directed to the fact that a plate 221 is provided in the front upper corner of the separator box above the screen eccentric in order to assist in the action of the fan, and that the fan casing is supported by forwardly extending supports 222 projecting from the sides of the separator casing. Obviously, if desired, the fan may be provided with any suitable means for regulating the draft thereon, these means being well known in the art.

Coöperating with the separator screens in collecting the weed seed and returning the tailings to the cylinder, and any grain which may pass out through the screens to the straw carrier, is a section 223 which rests upon the upper edges of the thresher casing, being suitably attached thereto by any readily removable means, as by bolts 224 at its rear end and a holding clip 225 at its front end. This removable section is provided with a weed seed receptacle 226 at its front end disposed beneath the weed seed screen 214, which receptacle is adapted to collect the weed seeds falling down through the screen 214 and thus prevent a redistribution of these seeds over the ground in the field. Carried at the back of the section 223 is a downwardly and rearwardly extending plate 227 which coöperates with a series of downwardly and forwardly extending parallel fingers 228 carried on a transverse shaft 229 supported in the separator casing 200 at a point in rear of the lower screens. The lower ends of these fingers 228 rest on the upper edge of the inclined wall 227 and act to deflect the tailings or unthreshed heads which may be blown out through the screens by the fan 217, down in front of the plate 227, while any grain which may be blown out through the screens will pass over the same, or through the same in back of this plate 227.

Coöperating with the plate 227 is a second downwardly and forwardly inclined plate 230 extending across the top of the thresher casing but having its front end spaced apart from the front end wall 128 of the casing and its rear end spaced apart from the rear wall 129 of the casing. It is thus seen that as the tailings fall down over the fingers 228 they will fall upon the plate 230 and be deflected by it over onto the cylinder 109 at a point adjacent the front wall 128 of the thresher casing, while, due to the opening between the rear end of the plate 230 and the end wall 129 of the thresher casing, the threshed grain which may be blown out by the fan 217 will be enabled to pass down over the plate 227 and into the thresher casing so that it can fall upon the straw carrier 146 in the usual manner.

Receiving the clean grain which passes down through the screens 206 and over the weed seed screen 214 and the chute 216 is a longitudinally disposed grain chute 231 supported at its rear end on a support 232 carried by the separator box and at its front end connected to a screw conveyer casing 233 supported beneath the fan by U-shaped supports 233'. This chute delivers the clean grain to a screw conveyer 234 carried on a shaft 235 and movable in the casing 233, which in turn delivers the same stubblewardly to an elevator 236 of the same paddle type as the elevator carried in the casing 198, this elevator 236 being carried in a casing 237, braced on a grain box 238 by braces 239, and delivering the grain to that grain box with the same spreading action as that of the elevator paddles 195.

The power connections for all of the elements of this separator mechanism are operatively connected to the main power shaft 44 through the chain 102, the rocking connection 208 for the separator being driven through a sprocket 240 and having a pulley 241 on the opposite ends of its shaft, which, through a cross belt 242, transmits rotation in the reverse direction to a second pulley 243 carried on the shaft 218 of the fan, while the screw conveyer shaft 235 is rotated through a sprocket connection 244 and is directly connected to the elevator 236 at its opposite end.

As indicated above, the conveyer 236 throws the clean grain rearward into the grain box 238 which forms a part of the grain bagging mechanism.

*Grain bagging mechanism.*

As shown, this box 238 is disposed longitudinally of the frame above the main wheel 1 and is rigidly connected at its grainward side to the separator box 200.

An end elevation of this box is shown in Figs. 2 and 6, wherein it is to be noted that the same is provided with an inclined bottom 245 and a vertical stubbleward wall 246, the box being supported and braced on the outer longitudinal frame member 5 by suitable vertical supports 247 and so positioned that it overhangs a platform 248 pivotally connected at 249 to the lower ends of the supports 247 and also connected thereto by link and chain connections 250 attached at their upper ends to the upper ends of the supports and at their lower ends to a point near the outside of the platform 248.

As shown, this platform is disposed beneath and at the stubbleward side of the grain box 238 in such a manner that an operator seated on a seat 251 carried on the platform 248 may bag the grain issuing from the stubbleward side of the box through grain spouts 252 of any suitable construction.

Any suitable form of bag holding device may be used in connection with these chutes and a plurality of these chutes may be provided along the length of the grain box so that an operator seated on the seat 251 may fill a plurality of bags at a time, this construction being preferred, as I find that through the use of my improved elevating mechanism the grain is so distributed in the grain box that one of the bags fills more rapidly than the others, the filling of the bags, in fact, following a definite sequence which enables the operator to have sufficient time to sew the filled bags if desired during the interval while the others are filling.

Attention is here directed to the fact that by the construction shown the weight of the grain carried in the seed box is disposed directly above the main wheel 1 so that any grain carried by the machine acts to increase the traction of the latter, and that where the need of traction is very great the operator may carry as much grain as he sees fit in the grain box; or, in fact, where the traction needs are exceedingly heavy, may even carry one or two bags upon the platform 248. Attention may here also be directed to the fact that by the use of the pivoted platform 248 the entire platform may be folded up beneath the stubbleward end of the box 238, after the seat 251 has been removed, in such a manner as to afford a very compact construction during transport.

In order that the operation of the complete machine may be clear, I will briefly review the same.

*The operation of the complete machine.*

The grain cut by the cutting mechanism 60 is laid by the reel 61 upon the stubblewardly moving conveyer 63 and delivered by it to the rearwardly moving conveyer 80 which, in coöperation with the beater 98 and the supplemental conveyer 89, feeds the same heads rearward to the thresher 109. The latter delivers the straw and the major portion of the threshed grain rearward while the grain falling down through the concave passes downward over the chute 114, both the straw and grain thus falling upon the transversely moving straw carrier 146. This carrier then carries them grainward, the straw being turned and agitated and later further agitated as it moves grainward by the supplemental beaters 170, 173 and 174 at the same time that it is agitated by the agitating action of the rollers 169 and slats 149. Thus all the threshed grain is separated from the straw, the latter being delivered over the grainward end of the conveyer onto the ground, while the grain is fed forward through the screw conveyer 164 and delivered to the elevator 194 which elevates the same and spreads it over the surface of the screens 206, coöperating in this action with the distributer 201. The screen frame 207 is oscillated through the oscillating connection 208 and acts to separate the grain, the fan 217 in the meanwhile blowing out the dust, chaff and heads through the rear end of the separator screens, the chaff and other refuse being guided outward in their movement by the fingers 215, while the unthreshed heads are delivered by the fingers 228 and floor 230 to the cylinder, any grain which is blown out from between the screens falling down over the plate 227 to the straw carrier for another circuit through the machine. In the meantime the clean grain passes down over the weed seed screen 214, the weed seed falling down in the receptacle 226, while the clean grain passes down through the grain chute 231 to the stubblewardly moving auger 234 which delivers it to the elevator 236, in turn delivering it to the grain box 238, from which it is withdrawn from the box by means of the adjustable chutes or spouts 252. During this operation of the machine it is, of course, to be understood that the operator may, through the handle 33 on the platform adjusting member 30, vary the level of the machine platform as desired to accommodate different lengths of grain, and may, when necessary, throw out the entire mechanism by manipulation of the clutch controlling crank 55 through the handle 56.

It is to be noted that by my improved construction the machine may be quite light in weight without detracting from the traction developed by it, the improved arrangement of parts acting to increase the proportion of weight upon the traction wheel relative to the weight upon the other wheels. It is further to be noted that the construction is very compact, the width being practically that between the main wheel and the grain wheel, while the length is also relatively short, and, due to the location of the separator, the height of the machine is materially reduced. Attention is also directed to the fact that the distance through which the grain travels is also short, thus resulting in decreased draft and increased reliability of operation at the same time that it reduces the cost of manufacture by eliminating unnecessary conveyers.

Having thus specifically described one embodiment which my invention may assume in practice, I will now proceed to claim the invention, it being understood that the latter is not limited in any sense to the specific construction shown, as this is used for purposes of illustration and may be modified without departing from the spirit of the invention.

I claim—

1. In a harvester thresher, a frame, threshing mechanism disposed on the lower part of the frame, a spreader carried on said frame and disposed above said threshing mechanism, and means including a plurality of spaced fingers located entirely below the plane of the bottom of said spreader for transmitting the unthreshed heads directly from the upper separating mechanism to the lower threshing mechanism and for passing the unthreshed heads.

2. In a harvester thresher, a thresher cylinder, means for separating and discharging the straw at the rear of the machine, separator screens disposed above said cylinder, mechanism for delivering to said screens the remaining material threshed by said cylinder, means for creating a blast of air between said screens to remove the chaff from the tailings and threshed grain and discharging the chaff from the machine, and means above said cylinder and located below the plane of the lower screen for delivering to said cylinder the tailings discharged by said separator screens.

3. In a harvester thresher, a thresher cylinder, separator screens disposed directly above said cylinder, mechanism for delivering to said screens material threshed by said cylinder, means for creating a blast of air between said screens, and a transversely disposed inclined member located above said cylinder and entirely beneath the plane of the lower screen for deflecting to said cylinder the tailings discharged by said separator screens.

4. In a harvester thresher, a thresher cylinder, separator screens disposed directly above said cylinder, mechanism for delivering to said screens material threshed by said cylinder, and means for creating a blast of air between the screens to separate the chaff from the tailings and threshed grain and discharging the chaff from the machine, the path of the discharged chaff being free and unobstructed.

5. In a harvester thresher, a thresher cylinder, separator screens disposed above said cylinder, mechanism including a transverse conveyer for delivering to said screens material threshed by said cylinder, means for creating a blast of air between said screens, and means in the rear of said separator and above said transverse conveyer for delivering to said conveyer the threshed grain operated on by said blast and discharged from said separator.

6. In a harvester thresher, a thresher cylinder, separator screens disposed above said cylinder, mechanism for delivering to said screens material threshed by said cylinder, said material including tailings, threshed grain and chaff, means for creating a blast of air between said screens, and means above said cylinder for delivering to said grain delivering mechanism the threshed grain discharged from between the screens by said blast of air.

7. In a harvester thresher, a thresher cylinder, separator screens disposed above said cylinder, mechanism for delivering to said screens material threshed by said cylinder, said material including tailings, threshed grain and chaff, means for creating a blast of air between said screens, and means located above said cylinder and below the plane of the lower screen for delivering to said grain delivering mechanism the threshed grain discharged from between said screens by said blast of air.

8. In a harvester thresher, a thresher cylinder, separator screens disposed above said cylinder, mechanism including a transverse conveyer for delivering to said screens material threshed by said cylinder, said material including tailings, threshed grain and chaff, means for creating a blast of air between said screens, and means in the rear of said screens and above said transverse conveyer for delivering to said conveyer the threshed grain discharged from said separator screens by the blast of air whereby the threshed grain is returned to said separator.

9. In a harvester thresher, grain conveying mechanism, threshing mechanism receiving the grain therefrom, separator mechanism disposed above said threshing mechanism, means for delivering the threshed material to said separator mechanism, a forwardly projecting clean grain chute at the front end of said separator mechanism, a grain box, and a transversely disposed conveyer movable over said first mentioned conveying mechanism and delivering the clean grain to said grain box.

10. In a harvester thresher, threshing mechanism, a thresher casing inclosing the same, separator mechanism disposed above and in front of said thresher mechanism, a separator casing inclosing said separator mechanism, conveying mechanism delivering to said separator mechanism the material threshed by said threshing mechanism, a grain box disposed above said thresher casing and rigidly connected to the side of said separator casing, conveying mechanism delivering to said grain box the grain separated by said separating mechanism, and means disposed in the rear of and below the plane of the bottom of said separator mechanism for delivering unthreshed heads to said threshing mechanism.

11. In a harvester thresher, a threshing cylinder, a separator, means for delivering the threshed material from said cylinder to the front end of said separator, means for creating a blast of air for discharging the chaff separated from the tailings and threshed grain at the rear of the machine, the path of the discharged chaff being free and unobstructed, and means carried by the separator for guiding the chaff as it is discharged.

12. In a harvester thresher, a threshing cylinder, a screen separator, means for delivering threshed material from said cylinder to the separator screens, means for creating a blast of air between said screens and in a direction to discharge the separated chaff at the rear of the machine, and means located below the path of the chaff for conveying tailings to said threshing cylinder.

13. In a harvester thresher, a frame, a main wheel journaled thereon, driving members journaled on opposite sides of said main wheel, a transverse shaft journaled on said frame extending across the path of said main wheel, and driving connections between the opposite ends of said shaft and the driving members on said main wheel.

14. In a harvester thresher, a frame, a main wheel journaled thereon, driving members journaled on opposite sides of said main wheel, a transverse shaft journaled on said frame extending across the path of said main wheel, driving connections between the opposite ends of said shaft and the driving members on said main wheel, and threshing and separating mechanism operatively connected to said shaft.

15. In a harvester thresher, a frame, a main wheel journaled thereon, driving members journaled on opposite sides of said main wheel, a transverse shaft journaled on said frame extending across the path of said main wheel, driving connections between the opposite ends of said shaft and the driving members on said main wheel, and threshing, separating and conveying mechanism operatively connected to said shaft.

16. In a harvester thresher, a frame, a main wheel journaled thereon, a plurality of sprockets carried on opposite sides of said main wheel, a transverse shaft journaled on said frame extending across the path of said main wheel, sprockets carried on the opposite ends of said shaft, chains connecting said sprockets to said main wheel sprockets, thresher and separator mechanism carried on said frame, and driving connections between the same and said shaft.

17. In a harvester thresher, a frame, a main wheel journaled thereon, a plurality of sprockets carried on opposite sides of said main wheel, a transverse shaft journaled on said frame in rear of said main wheel, sprockets carried on the opposite ends of said shaft, chains connecting said sprockets to said main wheel sprockets, and a plurality of clutch members engageable with said shaft sprockets and controlling the connection thereof to said shaft.

18. In a harvester thresher, a frame, a main wheel journaled thereon, driving members carried on opposite sides of said main wheel, a transverse shaft journaled on said frame extending across the path of said main wheel, driven members carried on the opposite ends of said shaft, driving connections between said driving and driven members, clutch mechanisms controlling the connection of each of the driven members on said shaft, and operating mechanism for said clutch mechanisms including a single operating member.

19. In a harvester thresher, a frame, a main wheel journaled thereon, driving members carried on opposite sides of said main wheel, a transverse shaft journaled on said frame and disposed across the path of said main wheel, driven members carried on the opposite ends of said shaft, driving connections between said driving and driven members, clutch members engageable with said driven members controlling the connection of each of the same to said shaft, and a single spring coiled around said shaft normally retaining said clutch members in a predetermined position.

In testimony whereof I affix my signature, in the presence of two witnesses.

BERT R. BENJAMIN.

Witnesses:
REX. B. HITCHCOCK,
RAY D. LEE.